United States Patent [11] 3,542,325

| [72] | Inventor | Kurt Schwenk |
| | | Wolfsburg, Germany |
| [21] | Appl. No. | 705,221 |
| [22] | Filed | Feb. 13, 1968 |
| [45] | Patented | Nov. 24, 1970 |
| [73] | Assignee | Volkswagenwerk Aktiengesellschaft |
| | | Wolfsburg, Germany |
| | | a corporation of Germany |

[54] ADJUSTABLE FRONT SEAT FOR MOTOR VEHICLE
2 Claims, 4 Drawing Figs.

[52] U.S. Cl. ........................................... 248/393, 248/424, 297/328, 297/335
[51] Int. Cl. .......................................... B60n 1/08
[50] Field of Search .......................... 248/393, 397, 398, 395, 419, 424, 429, 421, 394; 297/344, 346, 326, 322, 321, 193, 335, 328

[56] References Cited
UNITED STATES PATENTS
1,728,655 9/1929 Beutner .................. 248/393

| 1,759,922 | 5/1930 | Templeton .................. | 248/393 |
| 1,916,346 | 7/1933 | Toncray et al. ............... | 248/395 |
| 2,057,591 | 10/1936 | Rast .............................. | 248/395 |
| 2,179,085 | 11/1939 | De Rose ....................... | 248/394 |
| 2,272,536 | 2/1942 | Votypka ....................... | 248/394 |
| 2,583,349 | 1/1952 | Widman et al. .............. | 248/394 |
| 3,170,728 | 2/1965 | Barenyi ........................ | 248/395 |
| 1,643,715 | 9/1927 | Kleinsmith .................. | 297/193 |
| 2,628,657 | 2/1953 | Orrick ........................... | 297/193 |
| 3,368,840 | 2/1968 | Dangauthier ................. | 248/420 |

FOREIGN PATENTS
| 585,196 | 1/1947 | Great Britain ............... | 248/393 |
| 944,693 | 12/1963 | Great Britain ............... | 248/429 |

Primary Examiner—Francis K. Zugel
Attorney—Watson, Cole, Grindle and Watson

ABSTRACT: A vehicle seat with a seat frame having a front edge member and a pair of rear supports with a track member for each support. A front support is secured to the front edge member of the frame.

Patented Nov. 24, 1970

3,542,325

INVENTOR,
KURT SCHWENK

BY Watson, Cole, Grindle & Watson
ATTORNEYS

ADJUSTABLE FRONT SEAT FOR MOTOR VEHICLE

The invention relates to an adjustable seat for power vehicles, particularly individual seats.

The invention endeavors to employ a small seat construction with a three-point support of which an object is to provide a front support secured to swing and bearing on the floor of the vehicle. By this invention there is attained not only a simple construction and thereby a qualified arrangement, but structural front-edge seat which is adjustable as to the height suitable for the occupant of the vehicle.

A further object of the invention resides in the feature of relaxing or detaching the connection between the supports and the seat cushion so that the entire seat can be swung back or forwardly so that thereby the space below the seat cushion can be utilized.

Another object of the invention resides in the provision of lever members so that quick and convenient adjustments can be made as to the position of the seat to accommodate a particular occupant of the vehicle.

Further objects will be apparent from the following description when considered in connection with the accompanying drawing in which.

Figure 1:
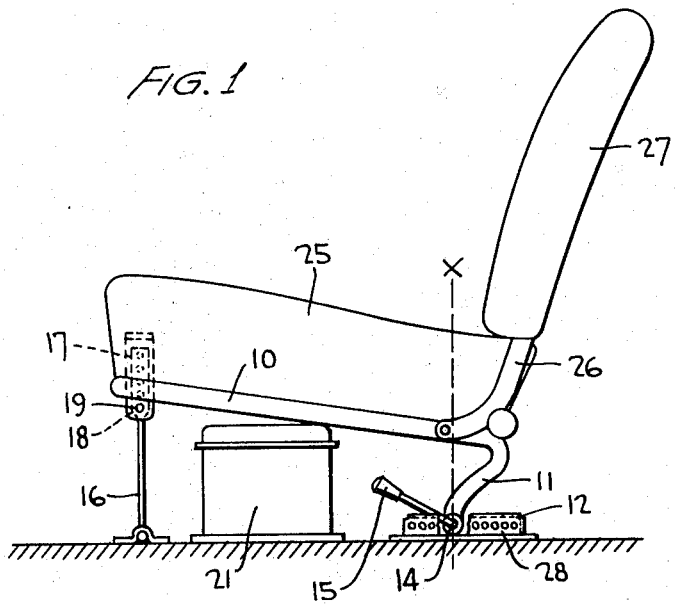
FIG. 1 is a side elevational view of the vehicle seat according to the invention.
Figure 2:
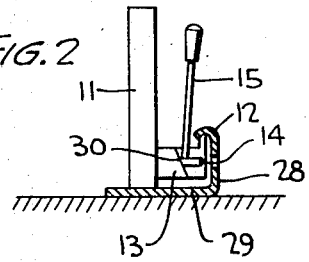
FIG. 2, is an end elevation partly in section of a detail of the rear seat adjusting latch and track on a larger scale.

The seat according to FIG. 1 shows a base frame 10 to support the seat cushion 25 thereon and a back frame 26 for the back portion 27, both cushion 25 and back portion 27 being padded as desired. The seat cushion frame 10 has at the rear, downwardly bent ends or feet 11 which terminate and are slidable in or on tracks 12. In order to adjust the position of the seat the track member 12, FIGS. 1 and 2, is provided with a plurality of holes or perforations arranged longitudinally in a vertical section 28 which is at right angles to a base plate 29. Each leg or foot 11 has a guide box or casing 13, FIG. 2, secured thereto and a bolt 14 projects therefrom with an actuating lever arm 15 secured thereto. This arm 15 will slide on a cam surface 30, FIG. 2, on the casing 13 to provide means to slide the bolt 14 laterally or horizontally into or out of one of the holes in the track 12. When actuating the lever arm 15, it will be possible to adjust or lock the seat in its adjusted position by moving the seat in a direction corresponding to the direction of movement of the vehicle.

Figure 3:
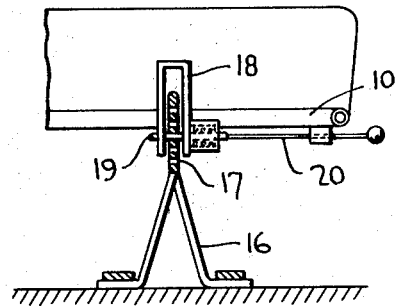
FIG. 3, is a front elevation of the seat adjusting front support.

A front support 16 is linked to the floor of the vehicle and is provided at its upper end with a plate or bar 17, having a plurality of holes therein as shown in FIG. 3, and which is mounted in a U-shaped fitting 18, secured or mounted in or to the seat cushion frame 10. A linked connection between the frame 10 and the support 16, is provided by means of a pin 19, which passes through two holes or bores in the fitting 18, as well as through a hole in the plate 17. An adjusting rod 20, projects laterally from the plate 17, under the frame 10, and is slidable relative to the pin 19. In this way it is possible to adjust the seat by pulling out the pin 19 so that the back feet 11 can swing backwardly in order to make it possible to provide accessibility to the space under the seat 10. For this purpose the bolt 14 will form the swing axle for the seat. The space under the seat 10 can, for example, be used to provide a battery box or casing 21 and to store tools and the like. The pivoting movement of the seat can also serve the purpose of providing a space in the vehicle.

The lower ends of the feet or legs 11 will provide also the pivot points for the height adjustment of the front edge of the seat. In order to make it easier to adjust the seat during the movement of the vehicle, the ends of the legs or feet 11 and the bolt 14 contacting the track 12 are arranged at a point X to indicate the swing point of the seat and its occupant. In this way, the occupant of the vehicle can maintain his upper body in the seat in balance and thereby adjust for height with a minimum of effort.

The supports 16 are arranged in FIG. 1 approximately vertical and sets thereby the height of the front edge of the seat as to its heighest position. If the seat is pushed back then the front edge of the seat will creep or move at the same time downwardly, dependent on the slant setting of the supports 16. Thus there is attained, that for a person of small size when the seat is adjusted forward, that a raising of the seat surface will follow, whereas when a seat is adjusted backwardly for persons of larger size, there will follow a lowering of the surface of the seat. In order to maintain within limits, the angular adjustment of the legs 16, in the back sitting position, it can in its extreme position, easily be moved forwardly. One can thus in the forward position, slide the seat so that there will only be a slight raise of the front edge without essentially or materially changing the positions of various parts of the seat.

Figure 4:
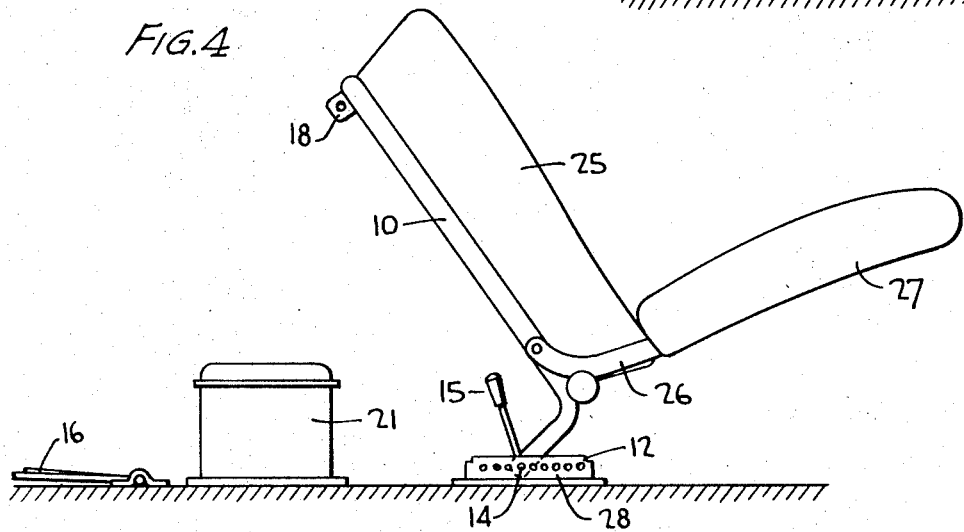
FIG. 4, is a side elevation of the seat in raised position.

FIG. 4, shows the seat and frame 10 with the seat in raised position and the support 16 out of the way on the floor of the vehicle.

I claim:

1. A vehicle front seat and mounting comprising a seat frame having a front edge member, a pair of downwardly directed rear supports secured to the frame, a track member adapted to be secured on a floor of the vehicle and provided for slidably receiving each support, the track member having a plurality of spaced holes therein longitudinally arranged, an operating handle with a separable bolt arranged along the side of the seat, a front support pivotally secured onto the floor of the vehicle and provided at its upper end with a plurality of holes adapted to be connected with the front edge member, and a pin and handle slidably mounted relative to said front support and projecting laterally from the front support and under the frame so that the front edge member may be adjusted vertically when the vehicle is in motion, and the front support being separable from the frame to permit the latter and the seat to tilt around the rear supports and around the pin of the operating handle with the pin forming a swing axle for the seat.

2. A vehicle seat according to claim 1, in which means are provided on the front support whereby the latter is secured to the front edge of the frame so that the front support may be separated from the frame to permit the frame and seat to tilt around the rear supports at the track member, and in which the swing axis of the frame and seat is approximately vertical below the center of gravity of the seat and an occupant of the seat.